(12) United States Patent
Hartmann

(10) Patent No.: US 7,823,898 B2
(45) Date of Patent: Nov. 2, 2010

(54) MULTIPLE SPEED CHAINLESS DRIVE FOR A UTILITY TRICYCLE WITH EITHER TORQUE AMPLIFYING PEDAL BEAMS OR A CONVENTIONAL BICYCLE SEAT AND PEDALS

(76) Inventor: Dirck T. Hartmann, 4121 Morning Star Dr., Huntington Beach, CA (US) 92649

( * ) Notice: Subject to any disclaimer, the term of this patent is extended or adjusted under 35 U.S.C. 154(b) by 350 days.

(21) Appl. No.: 12/148,261

(22) Filed: Apr. 18, 2008

(65) Prior Publication Data
US 2009/0278330 A1 Nov. 12, 2009

(51) Int. Cl.
*B62M 1/04* (2006.01)
(52) U.S. Cl. .................. 280/253; 280/255; 280/256; 280/257; 280/258
(58) Field of Classification Search ............. 280/253, 280/255–258
See application file for complete search history.

(56) References Cited

U.S. PATENT DOCUMENTS

| | | | | |
|---|---|---|---|---|
| 5,520,401 | A * | 5/1996 | Mohseni | 280/221 |
| 6,209,900 | B1 * | 4/2001 | Yoshizawa | 280/252 |
| 6,439,590 | B1 * | 8/2002 | Liang | 280/221 |
| 6,557,880 | B2 * | 5/2003 | Drew | 280/259 |
| 6,659,486 | B2 * | 12/2003 | Eschenbach | 280/221 |
| 6,715,779 | B2 * | 4/2004 | Eschenbach | 280/221 |
| 6,716,141 | B2 * | 4/2004 | Bhoopathy | 482/51 |
| 6,764,088 | B2 * | 7/2004 | Hung | 280/221 |
| 7,111,860 | B1 * | 9/2006 | Grimaldos | 280/253 |
| 7,293,789 | B1 * | 11/2007 | Efros et al. | 280/251 |
| 7,686,317 | B2 * | 3/2010 | Hartmann | 280/256 |
| 2002/0130484 | A1 * | 9/2002 | Fa-Kuang | 280/281.1 |
| 2003/0025293 | A1 * | 2/2003 | Drew | 280/253 |
| 2003/0193158 | A1 * | 10/2003 | Hung | 280/221 |
| 2006/0103105 | A1 * | 5/2006 | Fan | 280/221 |

* cited by examiner

*Primary Examiner*—Lesley Morris
*Assistant Examiner*—Michael R Stabley

(57) ABSTRACT

The improved chainless drive of the present invention features a four speed planetary transmission housed within the hub of the driving wheel of an utility tricycle, and an vehicle frame which provides two options for delivering power to the transmission. In the first option the drive shaft, which extends out through bearings on the center line of the driving wheel, has a crank arm fixed on each end. A spindle is fixed in the end of each crank arm and a pedal beam is rotatably mounted near its center on each spindle. A cam roller mounted on each pedal beam near its aft end engages a short length of steel track fastened on the sides of a trunk bolted on the at end off the tricycle frame. The cam roller provides a downward force to counter balance the weight of the rider on the cantilevered forward end off the pedal beam increasing the force on the spindle and thus amplifying the torque delivered to the drive shaft. In the second option the pedal beams are replaced with conventional bicycle pedals and bicycle seat and the trunk is bolted on the forward end off the tricycle frame. Storage space in the fiberglass trunk permits use of the utility tricycle for shopping.

5 Claims, 6 Drawing Sheets

MULTIPLE SPEED CHAINLESS DRIVE FOR A UTILITY TRICYCLE WITH EITHER TORQUE AMPLIFYING PEDAL BEAMS OR A CONVENTIONAL BICYCLE SEAT AND PEDALS

BACKGROUND OF THE INVENTION

Field of the Invention

This invention relates generally to pedal powered vehicles for transportation, cardiovascular conditioning, and recreation and particularly to frame configurations which permit the rider to either remain erect and simulating a running motion, or to use a conventional bicycle seat and pedals. In urban areas it provides the enjoyment and conditioning of running without the wear and tear on joints and muscles from repeated long distance runs on paved surfaces. The molded trunk of this utility tricycle provides the storage space required for transporting home the quantity of goods from a nearly full shopping cart, combining shopping with physical conditioning and saving fuel by reducing the number of automobile trips required.

SUMMARY OF THE INVENTION

The improved multiple speed chainless drive according to the present invention includes a wheel hub with spoke flanges for a typical 32 spoke 26 inch diameter bicycle wheel with a four speed planetary transmission housed inside the wheel hub; a drive shaft mounted in bearings on the axis of the wheel hub; and a tricycle frame which permits two options for delivering power to the drive shaft. The first option includes a crank arm fixed on each end of the drive shaft; a spindle press fit in the end of each crank arm; an extruded aluminum pedal beam mounted near its center on a pair of sealed ball bearings on each spindle; and a sealed cam roller mounted on the inside of each pedal beam near its aft end for engaging a short length of steel track fixed on both sides of a molded fiberglass trunk.

In the second option the crank arms, spindles, and pedal beams are removed and a conventional bicycle seat post and seat, and conventional pedal cranks and pedals are added. The trunk is moved from its aft location and bolted to the steering column between the front wheels to compensate for the rearward shift of the rider with the second option. Two pads are welded on the aft end of the tricycle frame for mounting the trunk, and a matching pair of trunk mounting pads are welded on the steering column. Bolts installed from inside the trunk engage threaded holes in the mounting pads so that when the trunk lid is closed and locked the mounting bolts cannot be removed providing security from theft for the trunk and its contents.

The four speed planetary transmission housed within the wheel hub includes a planet-gear-carrier fixed on and driven by the drive shaft; a ring gear with internal teeth with an extension of the ring gear passing out through bearings and fixed against rotation by the vehicle frame; four pairs of planet gears mounted on bearings in the planet-gear-carrier with each pair in constant mesh with the internally toothed ring gear; a sun-gear-carrier mounted on bearings with four sun gears sliding freely on the sun-gear-carrier with each sun gear in constant mesh with one pair of planet gears; a conventional one way clutch for driving the wheel hub from the sun-gear-carrier; and provisions for locking any selected one of the freely sliding sun gears to the sun-gear-carrier.

The provisions for locking any selected sun gear to the sun-gear-carrier include a tooth form in the bore of each sun gear which extends half way through the bore; a short length of plastic pipe pressed into the other half of the bore of each sun gear to maintain separation between adjacent sun gears; a pair of diametrically opposed slots through the sun-gear-carrier; a sun gear selector located in the space outside the drive shaft and inside the sun-gear-carrier with a tooth form extending out through each of the diametrically opposed slots for engaging the tooth form in the bore of any one of the four sun gears; and provisions for adjusting the axial position of the sun-gear-selector for engagement with any one of the four sun gears.

The provisions for adjusting the axial position of the sun-gear-selector include an axial hole in the center of the drive shaft extending inward from one end to a point past the end of the sun-gear-carrier; an axial slot through the drive shaft with the length of the axial slot equal to the travel required by the sun gear selector; a ring with the cross section of an angle with the radial leg on one side of the sun gear selector and the longitudinal leg passing through the center of the sun gear selector; a ring with a rectangular cross section on the other side of the sun gear selector with the longitudinal leg of the angle ring passing through it; a shift rod in the axial hole in the drive shaft with an expanded diameter on the inboard end and a reduced diameter the rest of its length; a transverse pin installed in a hole passing through the diameter of the ring with the rectangular cross section, the longitudinal leg of the angle ring, and the expanded diameter end of the shift rod; a set screw installed in the expanded end of the shift rod to hold the transverse pin in position; and provisions for the rider to shift gears.

Provisions for shifting gears include a compression spring installed in the axial hole in the drive shaft with one end of the spring seated against the expanded diameter end of the shift rod, and the other end against a bolt clamping the crank arm on the right side on the drive shaft, with a hole through the center of the bolt; a conventional small-pitch chain passing out through the hole in the bolt and connecting the shift rod with a control rod outside the transmission; an integral extension of the crank arm on the end opposite the spindle, with a slot in the end of the integral extension; and four conventional roll pins press fit in the control rod so that when the control rod is placed in the slot, a roll pin engages a small groove across the end of the extension. The space between the roll pins is equal to the distance the gear selector must travel to move from one sun gear to the adjacent gear, so that each of the roll pins corresponds to one of the four speeds the transmission provides. The provisions for shifting gears are the same for both options for delivering power to the transmission requiring an integral extension on the pedal crank on the right side to match the extension on the crank arm used with the pedal beam.

DESCRIPTION OF THE PREFERRED EMBODIMENT

Figure 3:
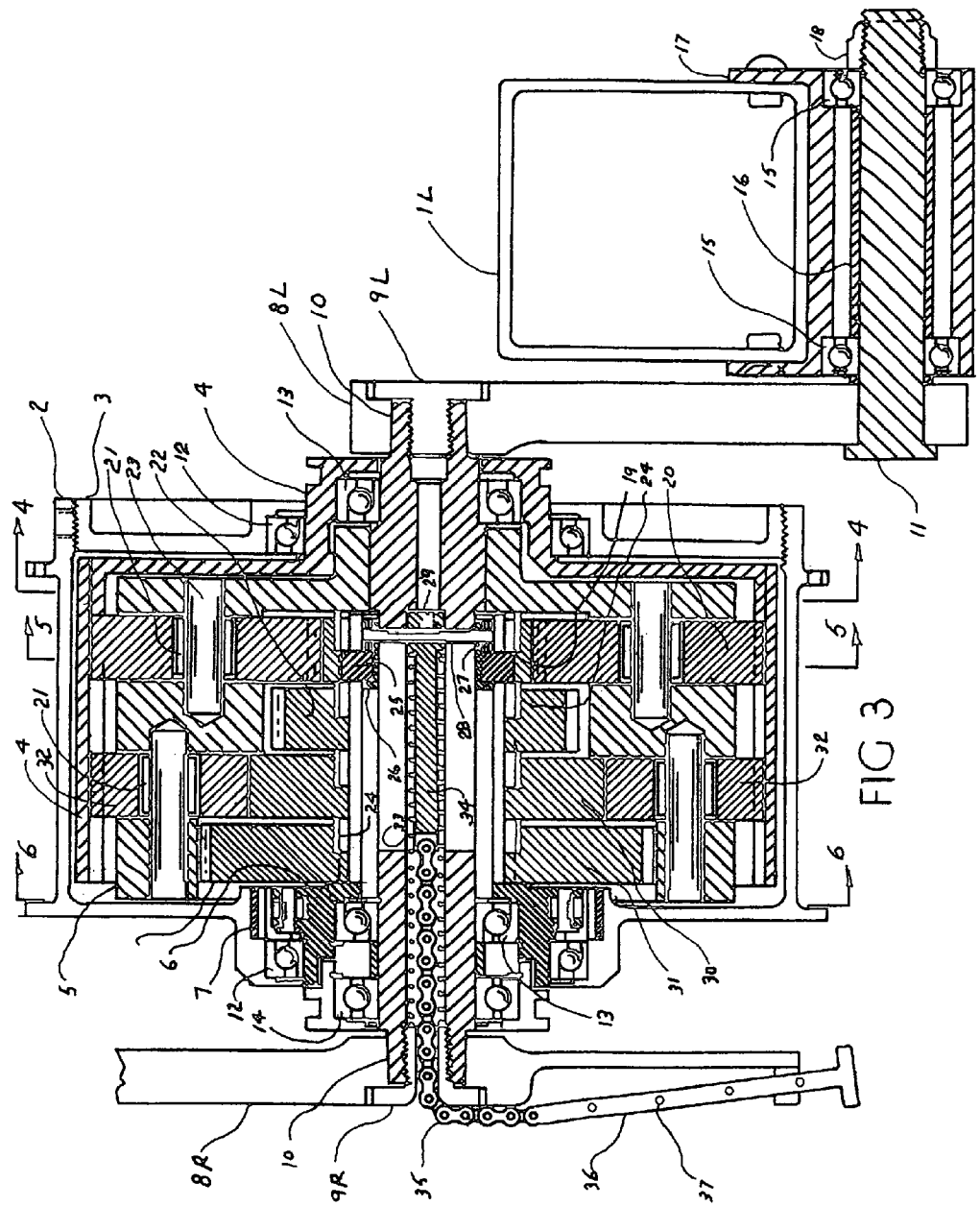
FIG. 3 is a section taken along the line 3-3 of FIG. 1 with the transmission shown removed from the vehicle frame for clarity.
Figure 4:
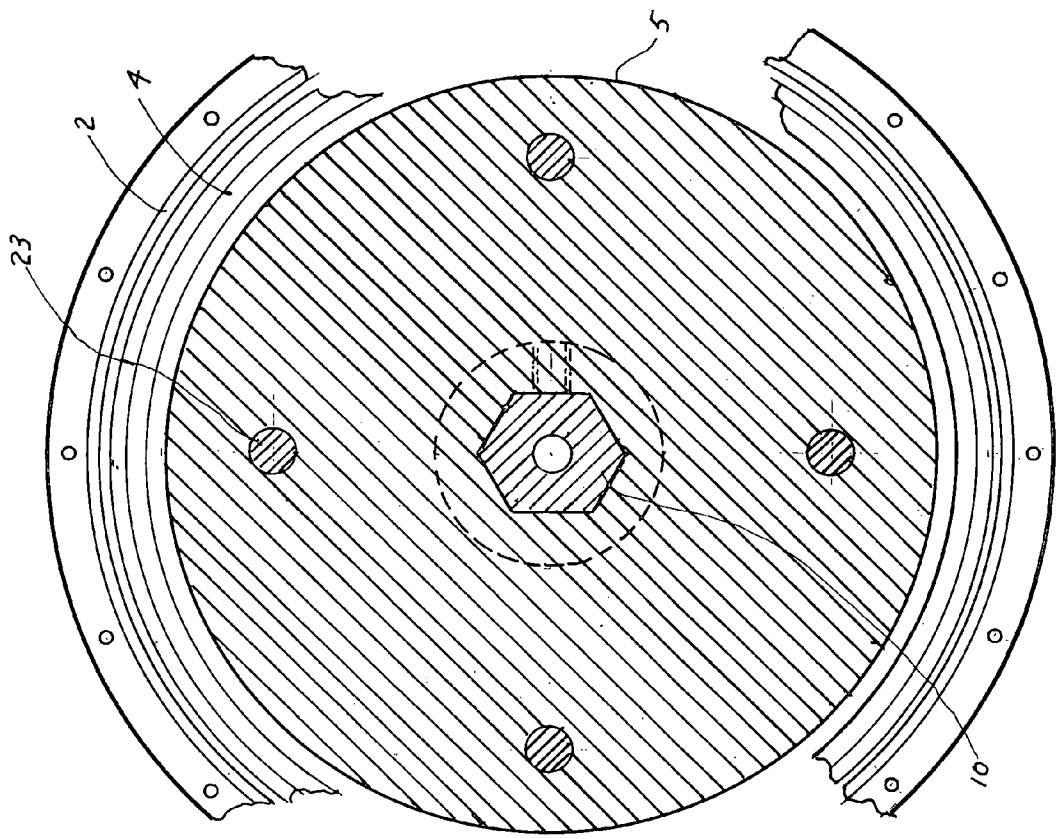
FIG. 4 is a section taken along the line 4-4 of FIG. 3.
Figure 5:
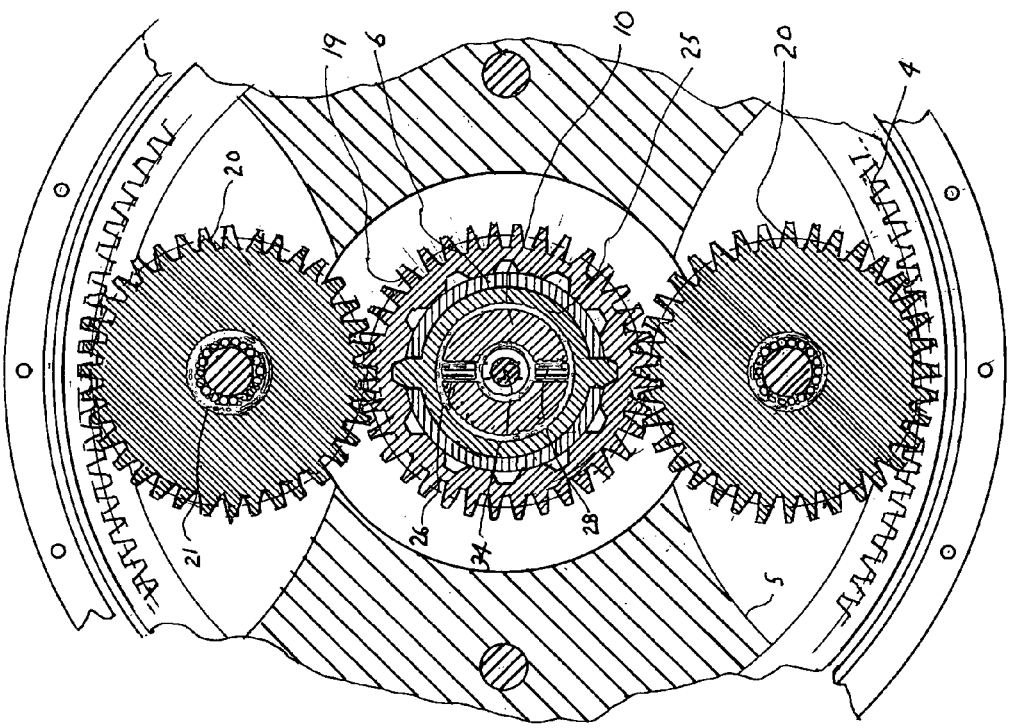
FIG. 5 is a section taken along the line 5-5 of FIG. 3

Referring to FIG. 3, the four speed transmission in accordance with the present invention includes a wheel hub 2, a wheel hub closing plate 3, a ring gear 4, a planet gear carrier 5, and a sun gear carrier 6. An integral extension of the ring gear 4 passes out through a wheel bearing 12 mounted in the wheel hub closing plate 3, and is clamped in the vehicle frame and prevented from rotating. The sun gear carrier 6 is mounted inside a second wheel bearing 12 seated in an integral portion of the wheel hub 2, and outside a bearing 13 mounted on a drive shaft 10. As shown in FIG. 4 the drive shaft 10 has a hexagonal cross section inside the planet gear carrier 5 with a set screw fixing its axial position on the drive shaft. The planet gear carrier thus always rotates at the speed of the drive shaft. Four sun gears 19, 22, 30, and 31 rotate freely on the sun gear carrier with spacing between adjacent sun gears maintained by a short thin walled piece of plastic pipe 24. Each of the four sun gears is in constant mesh with a pair of planet gears which are in constant mesh with the ring gear 4. As shown in FIG. 3, the sun gear 19 is in constant mesh with the pair of planet gears 20, and the sun gear 30 is in constant mesh with the pair of planet gears 32. A needle bearing 21 in the bore of each planet gear engages a hardened steel pin 23 press fit in the planet gear carrier 5. Referring to FIG. 5 and FIG. 3, twelve integrally machined teeth are located in the bore of each sun gear with their width equal to half the thickness of the gear. A plastic pipe 24 is pressed into the other half of each bore with the inside diameter of the plastic pipe a little larger than the root diameter of the internal teeth. Two diametrically opposed slots are located in the wall of the sun gear carrier 6, with a pair of integral teeth on a sun gear selector 25 projecting out through the slots for engaging the teeth in the bore of a sun gear, as shown in FIG. 5. The radial leg of an angle ring 26 is located on one side of the sun gear selector 25 and the longitudinal leg of the angle ring extends through the center of the sun gear selector, as shown in FIG. 3, with the rectangular ring 27 on the other side of the sun gear selector. As shown in FIG. 5 and FIG. 3, the drive shaft 10 has a narrow slot through it and a longitudinal hole along its center. A transverse pin 28 passes across the diameter of the rectangular ring 27 and the longitudinal leg of the angle ring 26, through the end of a shift rod 34, and is held in place by a set screw 29 in the end of the shift rod 34. The sun-gear-selector 25 slides freely between the radial leg of the angle ring 26 and the rectangular ring 27, permitting the differential rates of rotation required between the drive shaft 10 and the sun-gear-carrier 6. Provisions for changing the axial position of the sun-gear-selector include the shift rod 34, a compression spring 33, a chain 35 which passes out through a hole in the center of a bolt 9R clamping a crank arm 8R on the end of the drive shaft 10, and a control rod 36. With the control rod 36 placed in a slot in the end of the crank arm 8R, the axial position of the shift rod 34 is fixed by placing any one of four roll pins 37 in a notch across the end of an extension of the crank arm 8R.

Referring to FIG. 3, the extruded aluminum pedal beam 1L is riveted to a machined fitting 17. A bearing 15 is pressed into both sides of the fitting 17 with a spacer sleeve 16 located between the bearings 15. The pedal beam assembly is clamped on the spindle 11 by a self-locking nut 18.

Figure 6:
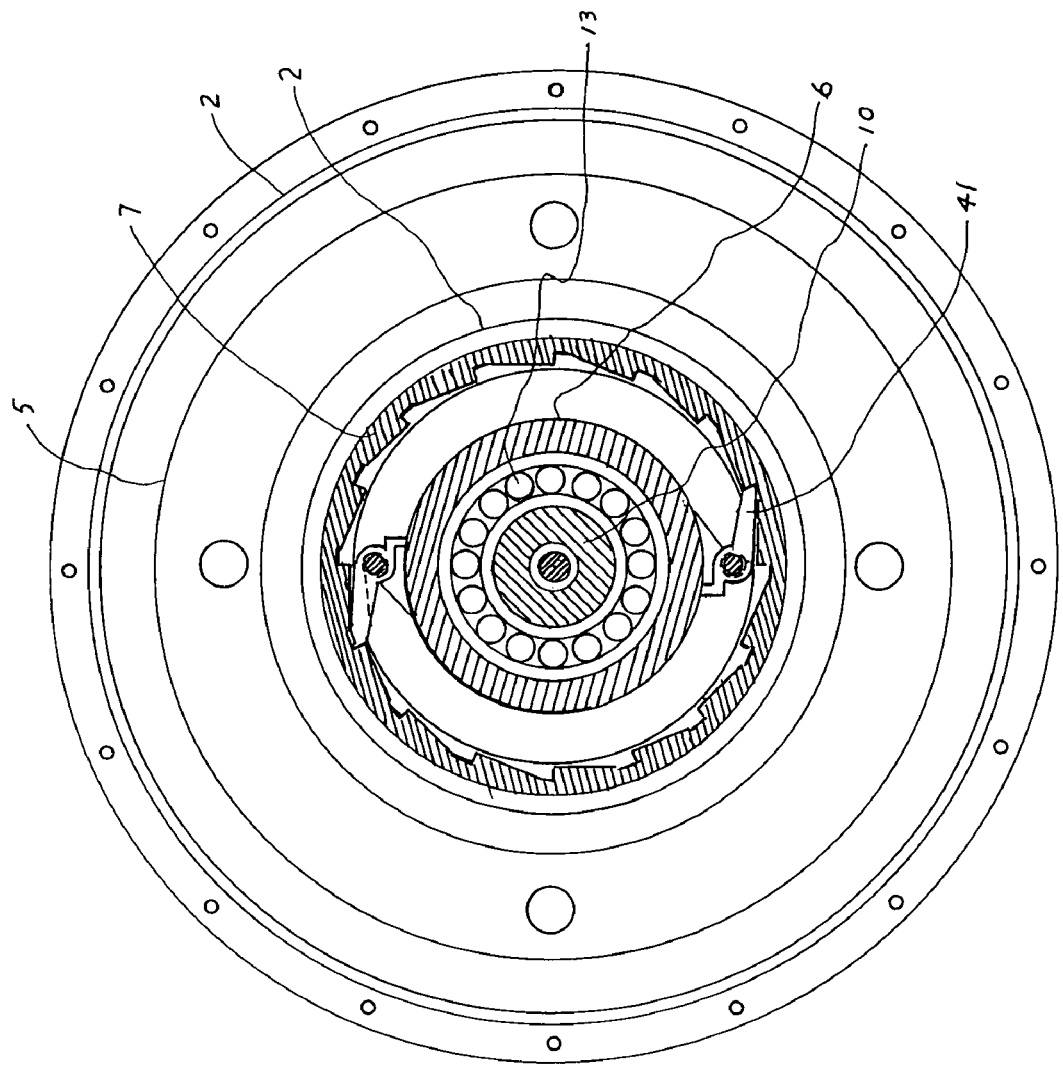
FIG. 6 is a section taken along the line 6-6 of FIG. 3

Referring to FIG. 6 as well as FIG. 3, a ratchet ring 7 is press-fit in an integral portion of the wheel hub 2. The ratchet ring 7 is driven by a pair of spring-loaded clutch dogs 41 mounted on the sun-gear-carrier 6.

Figure 1:
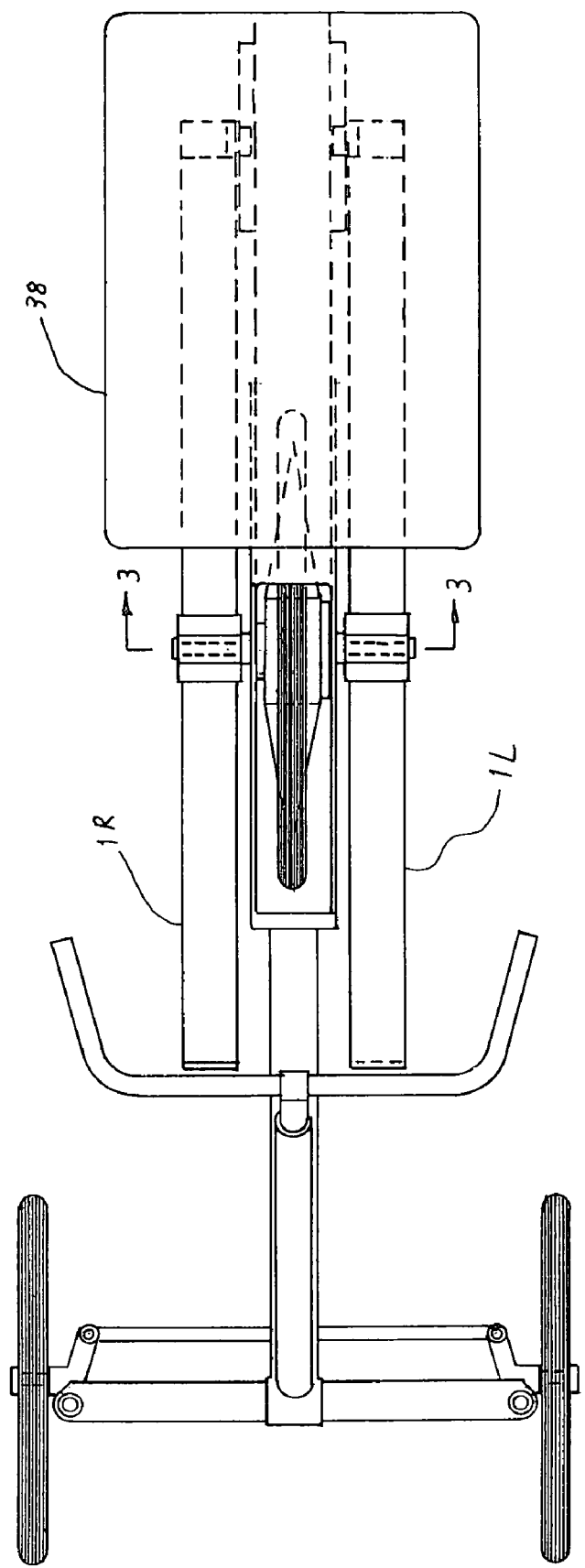
FIG. 1 is a plan view of a utility tricycle with the four speed transmission of the present invention in the hub of the driving wheel and a means of delivering power to the transmission according to option 1 of the present invention.
Figure 2:
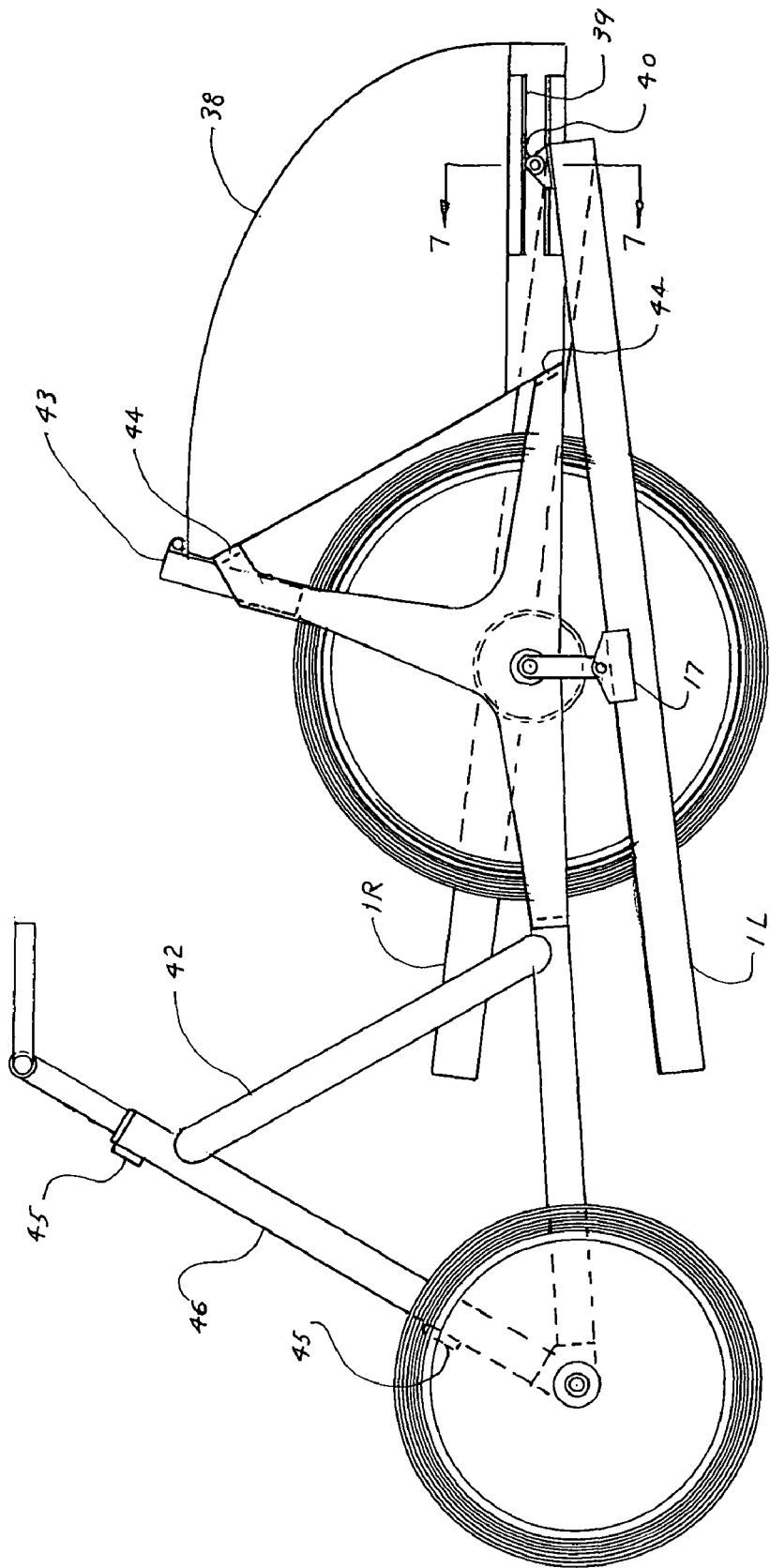
FIG. 2 is a side elevation view of the same vehicle.
Figure 7:
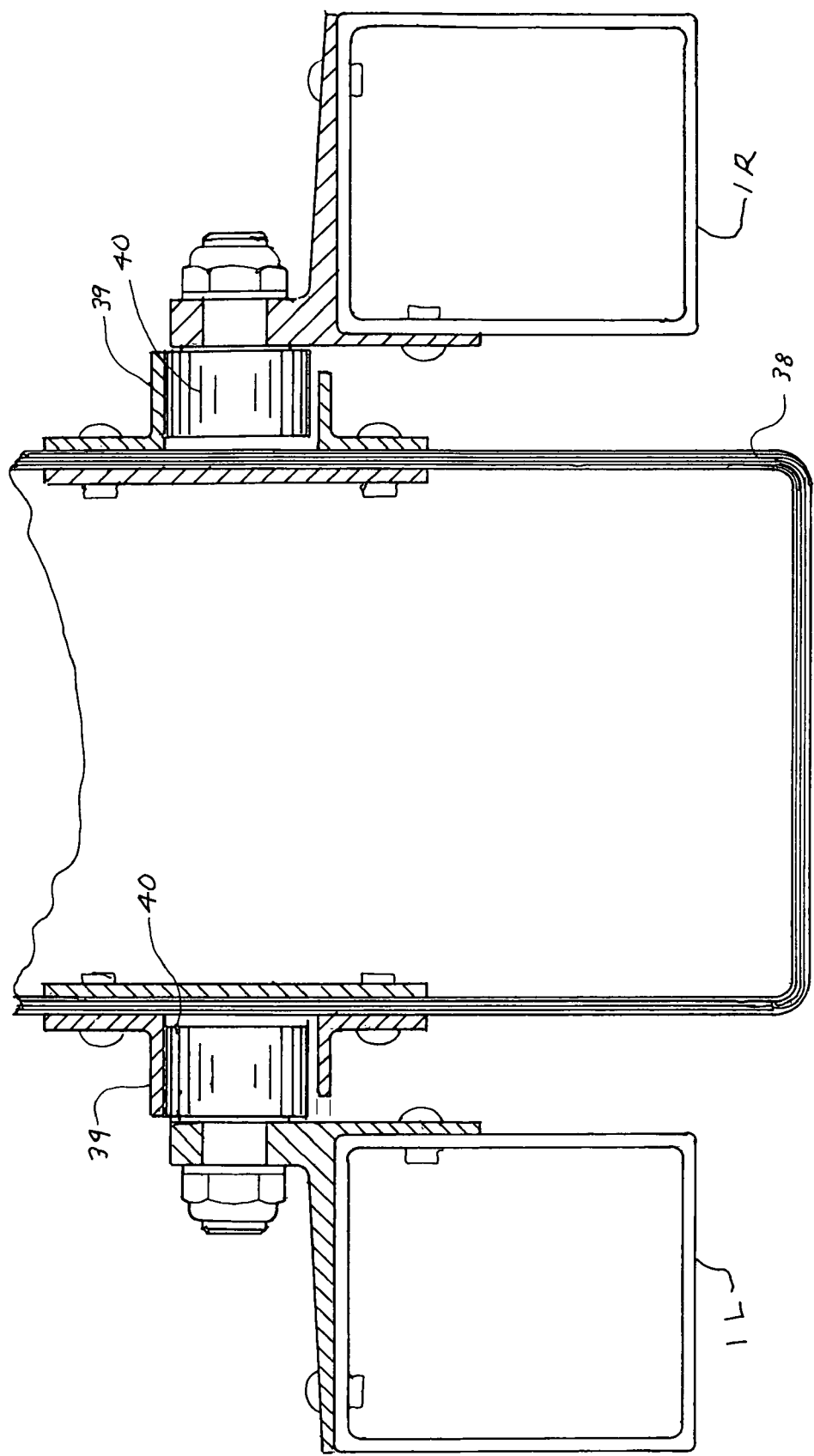
FIG. 7 is a section taken along the line 7-7 of FIG. 2

Referring to FIG. 7 and FIG. 2, a pair of steel angles 39 is riveted on each side of the fiberglass/epoxy trunk 38 forming a guide track for a cam roller 40 mounted on the aft end of each of the pedal beams 1L and 1R. The force between the cam rollers 40 and the tracks 39 balances the load the rider places on the cantilevered forward portion of the pedal beams 1L and 1R, while permitting the axial travel required by the length of the crank arms 8L and 8R.

Referring to FIG. 2, two trunk mounting pads 44 are welded to the aft end of the tricycle frame 42. The trunk 38 is fastened to the pads 44 with bolts which are installed from inside the trunk. The bolts are screwed into threaded holes in the pads 44. The configuration is shown in FIG. 2 for option 1 where the weight of the rider is located forward of the driving wheel on the pedal beams 1R and 1L. For option 2 where the pedal beams are removed and replaced with conventional bicycle pedals and a conventional bicycle seat, the tricycle frame 42 includes mounting provisions 43 for the bicycle seat post, and two trunk mounting pads 45 which are welded to the steering column 46. For option 2 the trunk 38 is removed from the pads 44 and bolted to the two pads 45. Moving the trunk 38 to this forward location compensates for the rearward shift of the riders weight in changing from option 1 to option 2.

In the example design used to illustrate the planetary transmission in accordance with the present invention, 20 pitch gears are used with a twenty degree pressure angle and ½ inch face width for each of the four sun gears and mating planet gears. 108 teeth are used for the internally toothed ring gear. The speed ratio equals $1+N/n$ where N is the number of teeth in the ring gear, and n is the number of teeth in the selected sun gear. The resultant four ratios and equivalent wheel diameter D for a 26 inch diameter driving wheel are given in the table below with N=108

| Speed  | n  | Ratio | Equivalent Wheel Diameter |
|--------|----|-------|---------------------------|
| First  | 72 | 2.5   | 65                        |
| Second | 60 | 2.8   | 73                        |
| Third  | 48 | 3.25  | 84.5                      |
| Fourth | 36 | 4.0   | 104                       |

While this invention has been described in terms of a preferred embodiment, it is anticipated that people reading the preceding descriptions and studying the drawings may think of many possible modifications. For example, to reduce the tooth stress three planet gears could be used in mesh with each sun gear instead of two. Likewise, the addition of a sun gear and mating set of planet gears could be used to increase the available number of speeds from four to five. It is therefore intended that the following appended claims be interpreted as including all such modification and alterations as fall within the true scope and spirit of the present invention.

I claim:

1. In a pedal powered tricycle including a frame with a separate trunk bolted on said frame, a chainless drive comprising a driving wheel with a central hub, a drive shaft mounted in bearings on the axis of said hub, crank arms fixed on the ends of said drive shaft, an improved four speed planetary transmission located within said hub for concentric rotation therewith and comprising:

a planet-gear-carrier fixed on said drive shaft for rotation therewith;

four pairs of different size planet gears mounted on bearings in said planet-gear-carrier;

an internally toothed ring gear in constant mesh with all four pairs of said planet gears with an integral extension of said ring gear fixed by said frame;

a sun-gear-carrier rotatably mounted in a fixed axial position on said drive shaft;

four different size sun gears rotating freely on said sun-gear-carrier with each of said sun gears in constant mesh with one pair of said planet gears;

free-wheel-ratchet means coupled between said hub and said sun-gear-carrier for driving said hub from said sun-gear-carrier;

sun gear locking means operative for locking any selected one of said sun gears to said sun-gear-carrier;

and gear ratio selection means for operating said sun gear locking means.

2. The four speed planetary transmission according to claim 1, wherein said sun gear locking means includes multiple teeth in the bore of each of said sun gears; a pair of diametrically opposed slots through the wall of said sun-gear-carrier; a selector ring located inside said sun-gear-carrier with a pair of integral teeth on said selector ring extending out through each of said diametrically opposed slots for engaging said multiple teeth in the bore of any of said sun gears.

3. The four speed planetary transmission according to claim 1, wherein said gear ratio selection means includes an axial hole through the center of said drive shaft; a slot through a portion of the length of said drive shaft; a channel ring surrounding said selector ring; a shift rod in said axial hole with a transverse pin connecting said channel ring with said shift rod; a compression spring forcing said shift rod to the end of said slot; a small pitch chain connecting said shift rod with a control rod outside said transmission; an integral extension on one of said crank arms with a slot in the end of said integral extension; and four transverse pins through said control rod.

4. The four speed planetary transmission according to claim 1, wherein the chainless drive further includes a first option with a spindle fixed in the end of each of said crank arms; a pedal beam mounted near the center of said pedal beam on bearings on said spindle; a cam roller fixed on the aft end of said pedal beam; and a steel track fixed on said vehicle trunk for engaging said cam roller.

5. The four speed planetary transmission according to claim 1, wherein the chainless drive further includes a second option with a conventional bicycle seat post and seat; conventional bicycle pedals replacing said pedal beams; and provisions for mounting said trunk on the forward end of said frame.

\* \* \* \* \*